Figure 1:
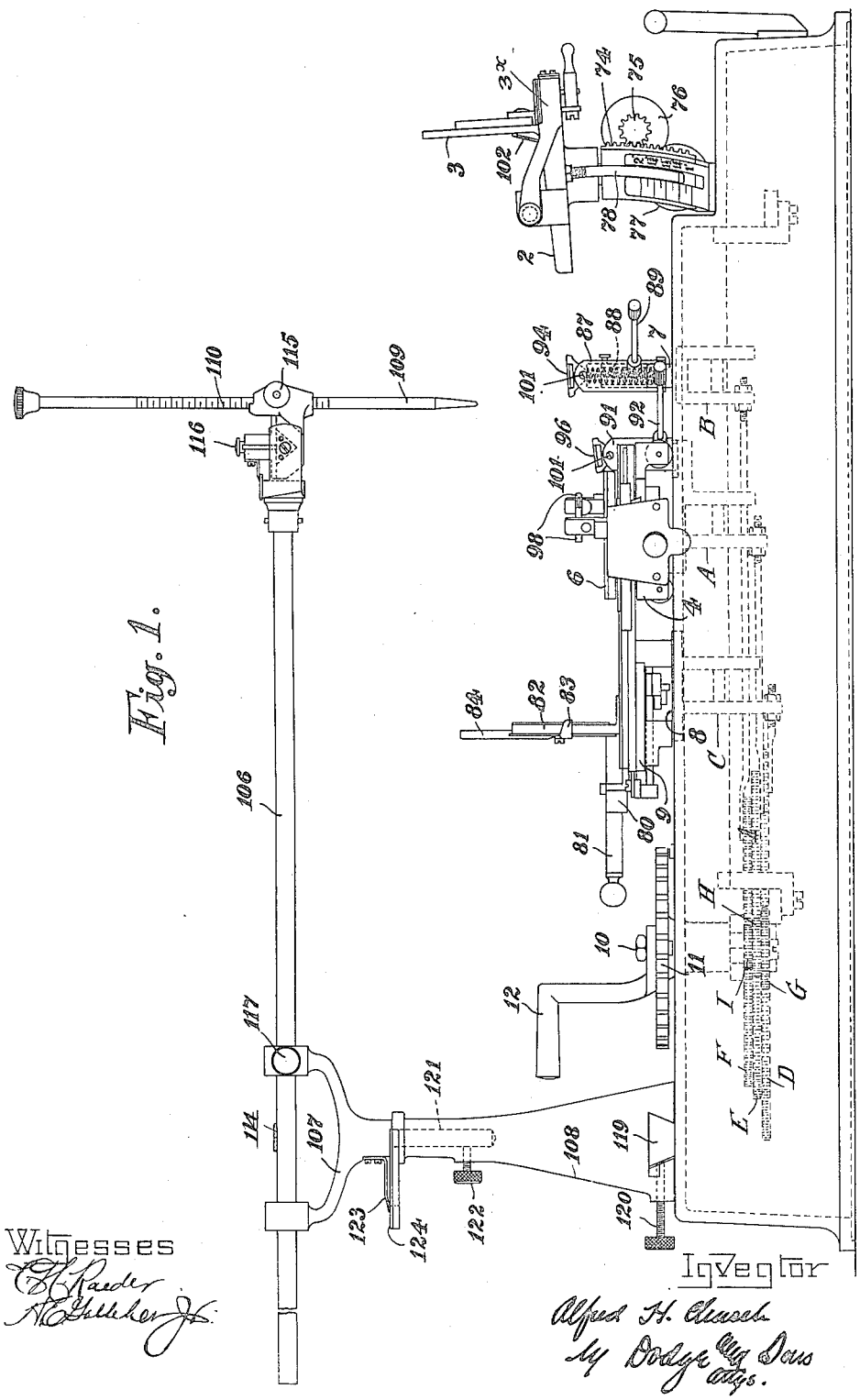

A. H. CHURCH.
APPARATUS FOR MEASURING FEET, LASTS, AND THE LIKE.
APPLICATION FILED AUG. 6, 1914.

1,167,269.

Patented Jan. 4, 1916.
7 SHEETS—SHEET 1.

A. H. CHURCH.
APPARATUS FOR MEASURING FEET, LASTS, AND THE LIKE.
APPLICATION FILED AUG. 6, 1914.
1,167,269.
Patented Jan. 4, 1916.
7 SHEETS—SHEET 3.
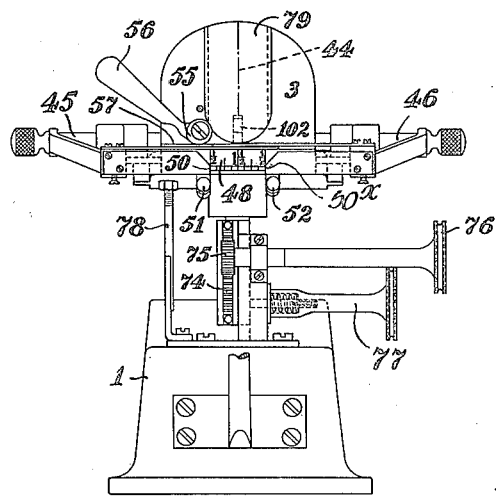
Fig. 3.
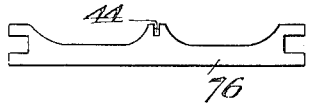
Fig. 3ª
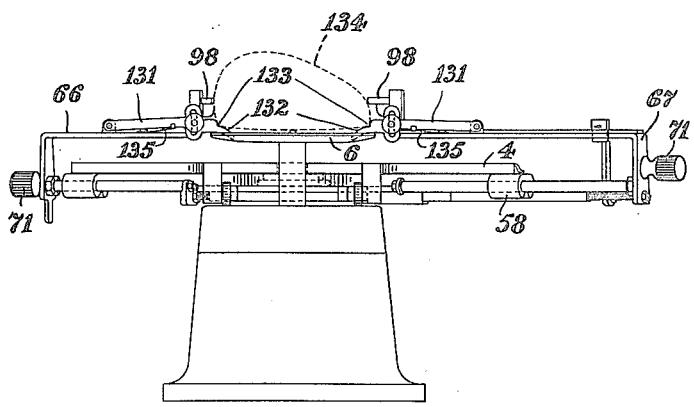
Fig. 4.
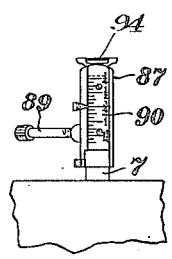
Fig. 8.
Witnesses
Inventor
Alfred H. Church,
by Dodge & Sons,
Attys.

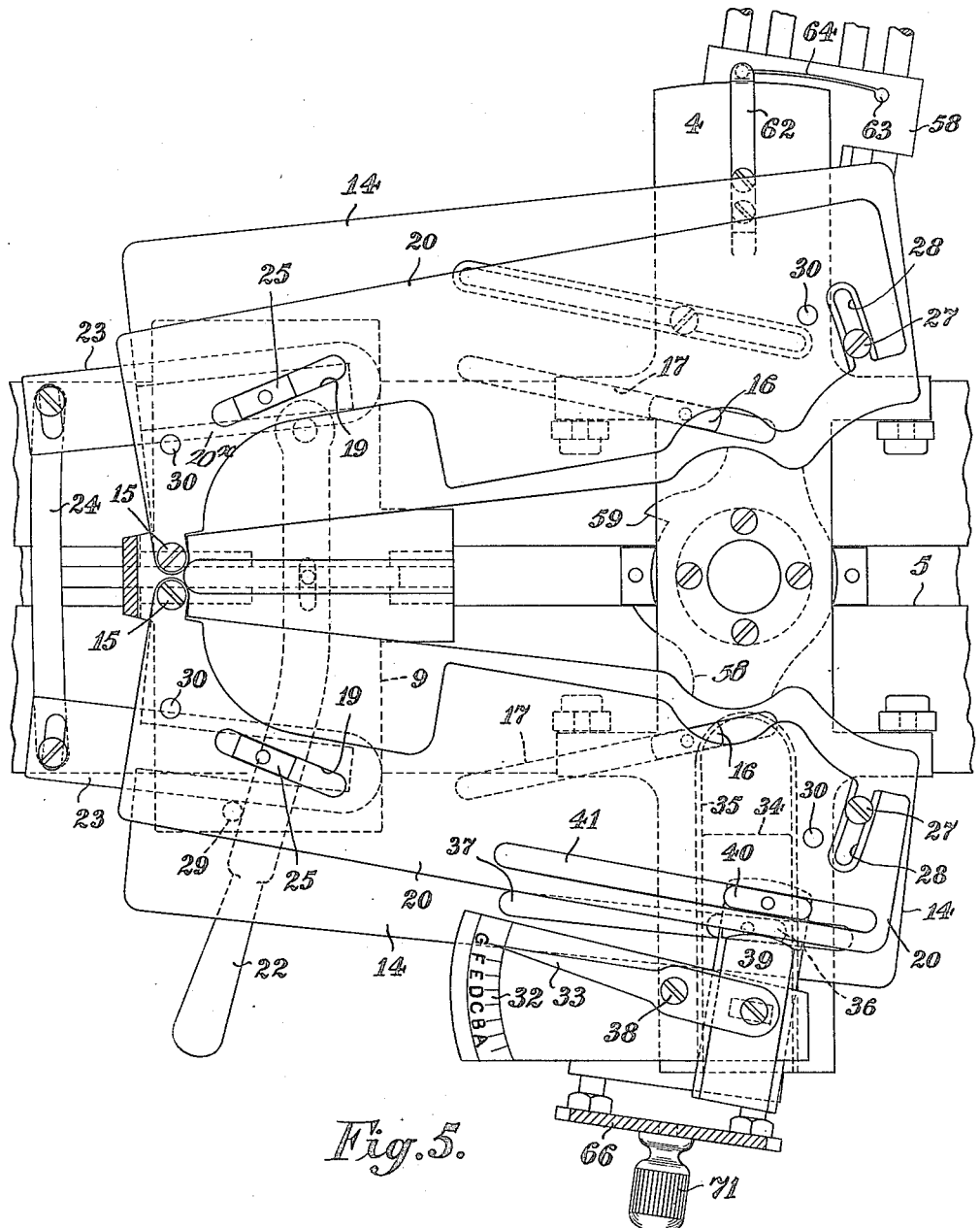

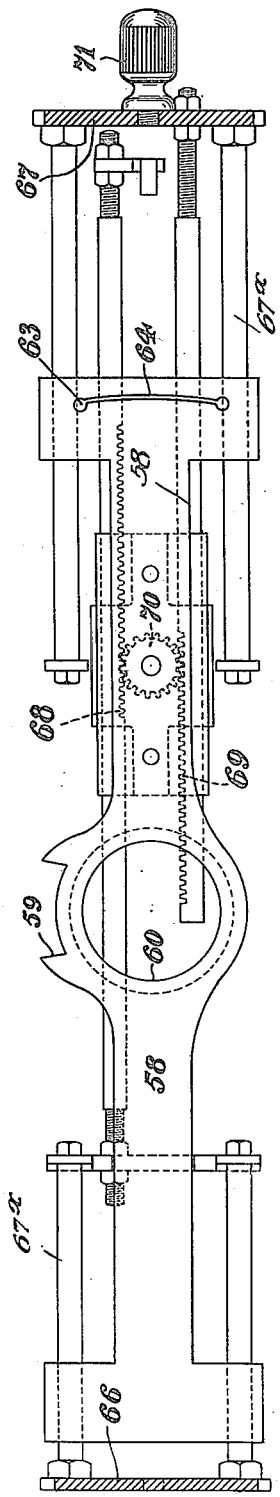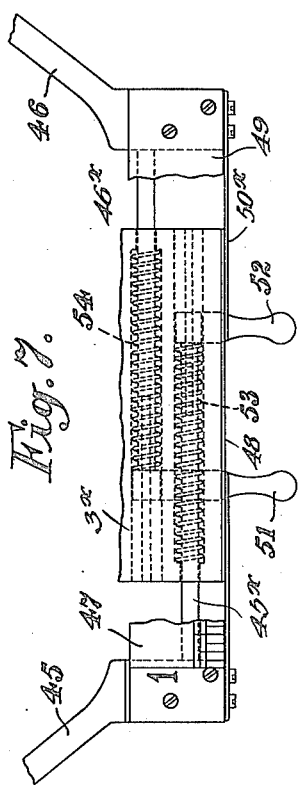

UNITED STATES PATENT OFFICE.

ALFRED HARRY CHURCH, OF LEICESTER, ENGLAND, ASSIGNOR TO PEDOGRADE COMPANY LIMITED, OF LEICESTER, ENGLAND.

APPARATUS FOR MEASURING FEET, LASTS, AND THE LIKE.

1,167,269.      Specification of Letters Patent.      Patented Jan. 4, 1916.

Application filed August 6, 1914. Serial No. 855,353.

*To all whom it may concern:*

Be it known that I, ALFRED HARRY CHURCH, a subject of the King of Great Britain, residing at Leicester, in the county of Leicester, in the Kingdom of England, have invented certain new and useful Improvements in Apparatus for Measuring Feet, Lasts, and the like, of which the following is a specification.

This invention has reference to foot and last measuring machines of the type comprising a base, a heel support carried thereby, and supports slidably mounted on the base for determining the positions of the instep and ball joint.

The old-fashioned size stick has a fixed upright at one end and for the back of the heel of the foot to rest against, with a sliding upright at the other end of the stick to be brought against the great toe, the distances being marked along the length of the stick, or sometimes an intermediate sliding piece for obtaining the measure of the foot at the waist, has been provided. This at best is very inefficient, because it does not take into account other measurements or peculiarities of the foot, and consequently it was usual for the customer to try on quite a number of different boots, until a more or less approximate fit was obtained, or else have the boots specially made to measure.

In the specification of Patent No. 973,475 there are described inventions by which the normal foot of a customer can be fitted with a boot from stock, with substantially as much accuracy and comfort as it could be fitted with boots made specially to measure. Such inventions embody the use of a measuring apparatus which indicates at a glance on dials, the size or fitting of boot or shoe required for any individual foot, so that if a sufficient range of boots and shoes be kept in stock, it is only necessary for a customer entering a shop, to put his foot upon the machine, which will indicate instantly what size, fitting and shape of boot, will provide a perfect fit. The attendant then brings the correct boots from the range kept in stock, so that the customer is suited in a moment, without his having to try on several boots before he is suited, and without danger of his obtaining a mis-fit. Such apparatus took into account no less than six necessary factors in the fitting of the human foot with boots and shoes, namely the exact positions of the instep and the ball joint of the foot relatively to the heel, the girth of the foot at the ball joint, the girth of the foot at the instep, the girth of the heel to instep, and the length of the foot, and for all practical purposes the apparatus is found to work perfectly inasmuch as it enables a boot seller to fit all normal feet with boots from a range in stock, with substantially as much accuracy, as if they were made to measure.

The present invention has been designed to provide certain improvements in measuring machines of the class referred to in said prior patents, by which other factors in the fitting of the human foot with boots and shoes, or in the measuring of lasts, are brought into account, such as the exact swell at either side of the heel, the height of the top of the foot or last above the tread at any point, the distance of the instep from the back of the heel, the thickness of the foot or last at the instep, the amount of rise at the instep, the angle twist at the fore part, the galosh center point *i. e.* the spot on the edge of the galosh nearest to the toe, the distance from feather to feather at the sole, and so on, so that such accuracy in measuring the human foot or last is secured, that boots in stock sizes shall fit practically any foot other than actual cripples as perfectly (or substantially so) as in bespoke bootmaking. Even if there be any exceptional peculiarity or deformity about the foot, the improved machines will denote the particulars, and the same can be conveyed to the last fitter so that he can produce just what is required. Furthermore by the improved measuring machine of the present invention, the exact measurements of a foot can be taken and form the basis by which a last of the exact size of the foot measured can be made, or by which a last may be corrected by subsequent working. All so-called misfits in boots and shoes may therefore be prevented by the use of this machine.

The invention is characterized in that the heel and ball joint of the foot or last are so positioned on the rests of the measuring machine, that a datum line passing through mid width or center of the widest part of the foot to the backmost part of the foot is established, from which measurements of the amount of swell at either side of the heel or other parts of the foot, can be made, or lines of direction or other features observed.

The invention is further characterized in that a surface gage, is mounted above the base for testing and measuring the upper part of the foot or last, also in conjunction with the heel rest carried by the base, and the supports slidably mounted on the base, for determining the thickness of the foot or last at various parts.

These and other features will be understood from the following description, reference being had to the accompanying drawings, in which:—

Figure 2:
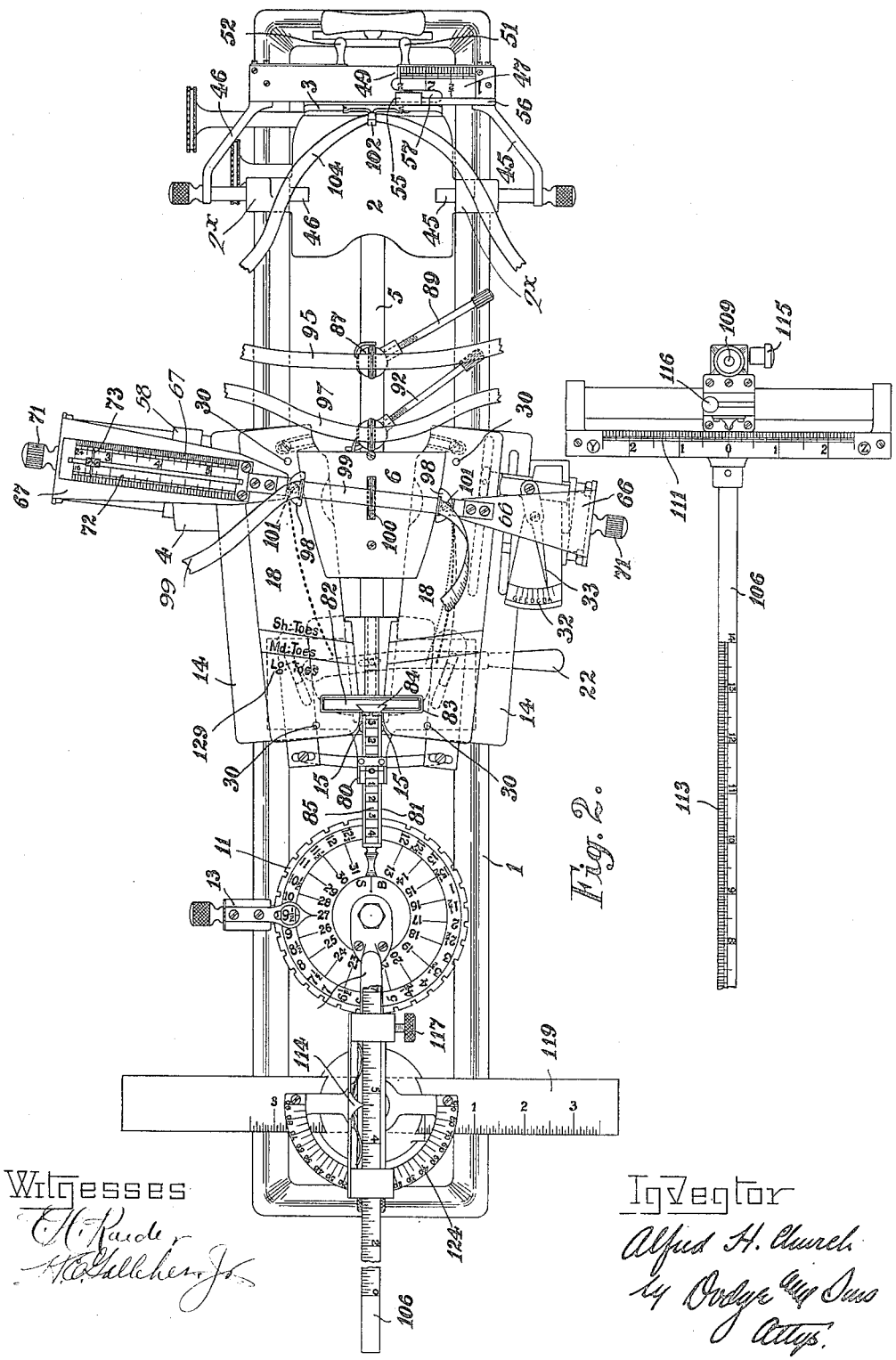
Figure 9:
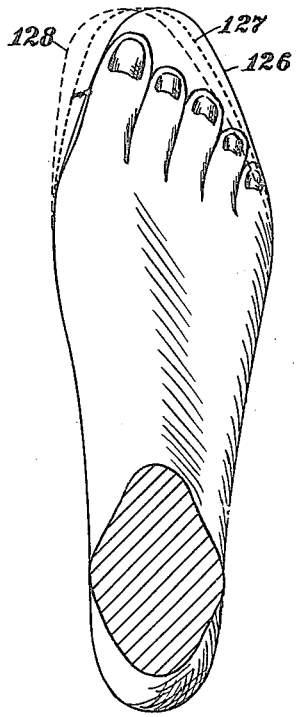
Figure 10:
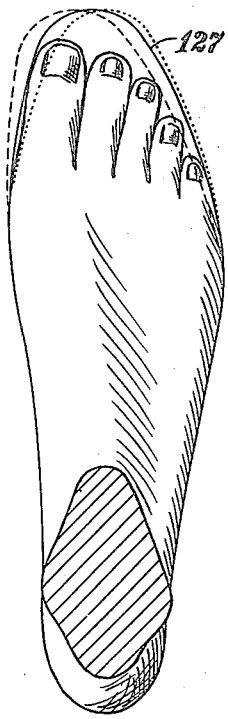
Figure 11:
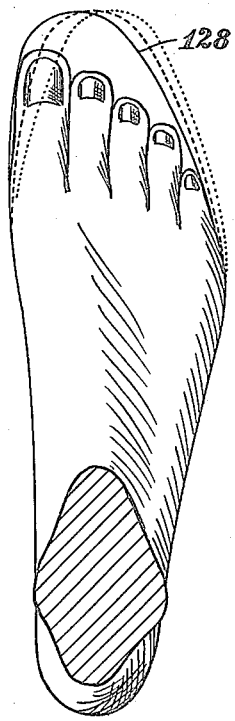
Figure 12:
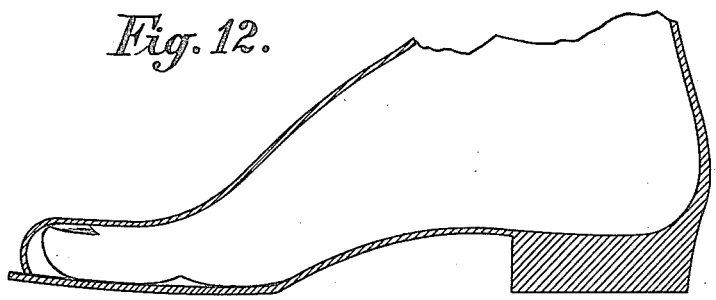
Figure 13:
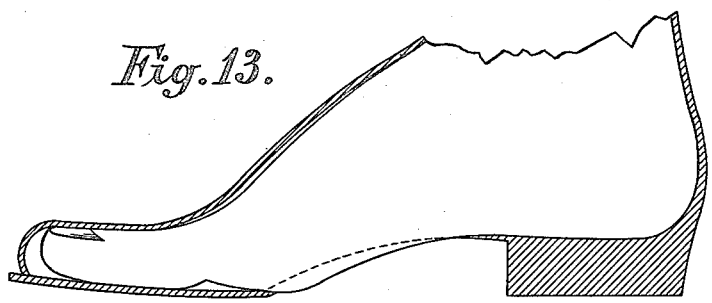
Figure 14:
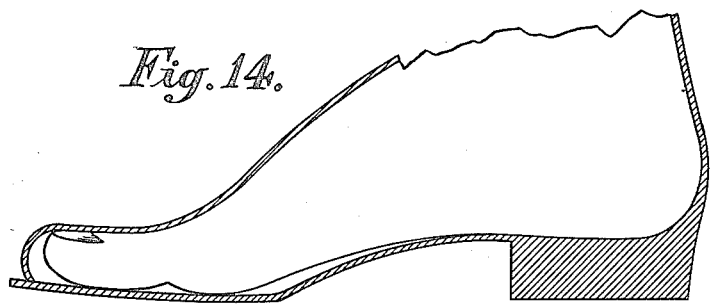

Figure 1 is a side elevation of the machine; Fig. 2 is a plan view thereof with the ball joint carriage and its index gage set for a right foot or last. In order to secure a clear view of the several parts of the machine, a part of the surface gage is broken off, and the broken off fragment inserted below this figure; Fig. 3 is an end view; Fig. 3ª is a top edge view of the sliding gate of the heel platform. Fig. 4 is a cross section of the machine at the index gage or locator. Fig. 5 is a fragmentary plan view of the fore part gage, but with the plates that have the designs of the different bottom shapes engraved on them, removed. Fig. 6 is a plan view of the index gage of the ball joint carriage; Fig. 7 is a fragmentary view of the index gage at the heel; Fig. 8 is a side view of the index gage of the instep carriage; Figs. 9, 10, and 11 illustrate the designs of the different bottom shapes that may be engraved upon the plates of the fore part gage, together with feet applied thereto. Fig. 12 illustrates a foot with a perfect fitting boot applied to it; Figs. 13 and 14 show feet which though of the same overall length, could not have the same boot applied to them with accuracy and comfort.

In order that the invention may be fully understood, I will describe the complete machine, part of which has already been described in the specification aforesaid, and then set forth the additions or improvements for which I now seek to secure Letters Patent.

Referring first to Figs. 1–7, 1 is the casing or base of the apparatus, 2 the raised platform for the heel carried by the base so that the heel is somewhat raised when the foot is measured, 3 an upright fixed at the rear of the platform 2 forming an abutment for the rear part of the heel. Above the casing or base 1, is a sliding carriage 4 which is mounted on the top of a depending bracket A, the latter projecting through a slot 5 in the base 1, the said slot running nearly the whole length of the base. The carriage 4 with its depending bracket, is hereinafter referred to as a ball joint carriage, and in connection therewith, is a rest 6 for the ball joint of the foot. This ball joint carriage is capable of being moved longitudinally of the base. 7 is the instep carriage which is also arranged to be moved longitudinally of the base, and 8 is a third sliding piece or carriage on which is mounted a table 9 for the fore part gage, this third carriage being likewise capable of being moved longitudinally of the base. The ball joint carriage 4, the instep carriage 7 and the carriage 8 of the fore part gage, are differentially moved longitudinally of the base by their depending brackets A B and C which project through the slot 5 in the base, having respectively attached thereto the three separate racks D E and F inside the base, each rack having a separate pinion G, H and I meshing therewith, the three pinions being all rotated by a single upright shaft 10 carrying a disk 11 and a handle 12, the disk being marked with sizes and half sizes. A suitable locking device 13 is provided for locking the disk 11 in its adjusted position. As there is in all normal feet practically a fixed relation as between the heel to the ball joint, the heel to the instep, and the heel to the fore part of the foot, the relative travels of the ball joint carriage 4, the instep carriage 7, and the carriage 8 of the fore part gage can be readily obtained, by making the respective pinions of such diameter as to produce the required relative or differential travels of the carriages.

The fore part gage comprises a pair of flat tables 14 which extend rearwardly and overlap the ball joint carriage 4. The tables 14 are pivoted to the table 9 on separate pivots 15. The top of the ball joint carriage has two studs 16 on its upper side, which enter respectively the slots 17 in the tables 14, the said slots being at an angle, the angle being such as to cause the tables 14 to expand as the tables move toward the disk 11 and contract as they move toward the heel platform 2. The shapes and sizes of the various bottom shapes of the fore part of boots supplied, could be engraved on these tables 14 so as to enable the shape of the boots most suitable for the comfort of the foot being measured to be ascertained. As however the widths of feet do not bear a fixed proportion to the length, it is necessary to provide means by which such engraved bottom shapes can be adjusted, to suit the width of individual feet being measured. In order to effect this the said designs of the different bottom shapes of the fore part of the boots and shoes supplied, are not engraved on the tables 14, but are engraved on plates 18 located above them, which are adapted to approach and recede from each other, at the same time as, and in unison with the contraction and expansion of the tables 14 of the fore part gage, and to travel longitudinally in unison therewith, but capable of being adjusted to suit the width of feet being measured. These engraved plates 18 might be mounted directly on the tables 14, but the mechanism for expanding and contracting them would involve the said plates being perforated with slots 19 which would bisect or mutilate the engraved designs, or otherwise render them indistinct. In order to avoid this, the slots 19 are made in a pair of supplementary tables 20 which are interposed between the two tables 14 and the plates 18. These tables are pivoted to the lower tables 14 and to the table 9, at 15. They move with the lower tables 14 when the handle 12 is turned, but are adjustable to any width required by the movement of a pivoted handle 22 hereinafter referred to. The plates 18 are held on the tables 20 by means of holes therein engaging studs 30 in the tables 20, so that 18 and 20 are compelled to move in unison. The tables 18 can however be readily removed by hand, turned over and refixed to the studs 30 in order to display other designs at the opposite side.

The machine so far described, is substantially the same, as set forth in the prior specification.

The improvements which I now seek to protect will be understood from the following description. According to these improvements, my apparatus seeks in the first place, to so position the foot or last on the supports or rests, that an imaginary or datum line is established from the back of the heel of the foot or last, and passing through mid-width or center of the widest part of the foot or last about the joint. From this datum line the exact amount of swell either side of the heel, or the distance from the said line to other parts of the foot or last, can be carefully measured, or lines of direction, or other features observed, including the angle degree from the center point of the joint to the end of toe, etc. To enable this datum line to be determined, the raised platform 2 for the heel or the upright 3 at the back thereof, has a central index line or mark 44 against which the backmost point of the heel is placed, while the ball joint carriage 4 has an index gage whose members are brought into contact with the opposite sides of the foot or the last so as to position the same. An index gage at the heel is also provided for locking the heel at the central index mark and determining the width of the heel, as well as its swell at either side of the datum line.

The index gage at the heel has sliding jaws or members 45, 46 one at each side of the center line, and the foot or last to be measured being placed between the jaws or members, on the heel platform 2 with its backmost point against the center mark, the jaws 45, 46 are brought into contact with the opposite sides of the foot or last and locked in that position. Then by means of two index scales 47 and 48 the distance apart of the jaws 45, 46, and their respective distances from the center line are at once determined. The first scale 47 by means of the index 49 shows the total width across the heel from side to side, and the second scale 48 by means of the index 50 shows the exact amount of swell at either side of the heel from the datum or center line.

In the construction shown in the drawings, the bearing on which the jaws slide embodies a flat bed $3^x$ extending rearwardly from the heel platform 2. Certain parts of the jaw members 45 and 46 which are in advance of the heel upright 3, and which come against the respective sides of the heel are guided in bearings $2^x$ cast to the heel platform 2, while those parts of the jaw members 45 and 46 which extend to the rear of the upright 3 have respectively attached to them, the oppositely arranged bars $45^x$ and $46^x$ passing through parallel guide holes in the bed $3^x$ so as to be supported thereby. The scale plate 47 is attached to one jaw member and rests on the top of the flat bed $3^x$, while the index plate 49 is attached to the other jaw member and rests on the top of the scale plate 47. The scale 48 is secured to the rear edge of the bed $3^x$, and the index plates 50, $50^x$ are attached to the jaw members so as to rest against the scale plate 48. Thus a good bearing is formed on which the jaws can slide. The ends of the two bars 45 and 46 are not coincident, but extend beyond one another, and such ends are provided with the knobs 52 and 51 projecting through slits in the underside of the bed $3^x$, and therefore by compressing the knobs together the jaws are spread apart and the springs 53, 54 compressed, and can be held in the spread apart position by an eccentric or other suitable lock 55. By releasing the lock 55 by its handle 56, the jaws spring inward automatically by the pressure of the springs and engage the respective sides of the heel, and can be locked by turning the locking handle. The lock 55 acts by binding the extension piece 57 against the index plate 49, thus locking both the said index plate and the scale plate 47 against the bed $3^x$. The sliding of the jaw 45 by its knob 52 slides the scale 47 and the index plate 50, and the sliding of the jaw 46 by its knob 51 slides the index plates 50 and $50^x$, the indications being read off on the scales 47 and 48.

Upon or in connection with the ball joint carriage 4, that is at the widest part of the foot or last, the index gage or locator 58 is so mounted that it can be turned through a considerable angle, for right and left feet, the turning being limited by a fixed stop on the carriage 4, and the cut away part 59 on the outside of the bored center portion 60 of the locator 58.

62 is a small spring latch piece or mousing secured to the ball joint carriage 4, the end of which has a projection or knob engaging one or other of the depressions 63 in the locator, the object being to hold the locator in one or other of its extreme positions. These two depressions 63 can be joined by a shallow groove 64, which forms a track to guide the knob into one or other of the depressions 63. The locator comprises an arm or carrier 58 adapted to turn by means of its center bored portion 60 on the ball joint carriage, and two saddle or guard pieces 66 and 67 mounted on the carrier 58 one at each side of the center line so that they turn with the carrier. These saddle or guard members which are shown provided with two pairs of parallel bars 67× passing through holes in the carrier 58 so as to be supported thereby, are each provided with a rack bar 68 and 69, meshing with opposite sides of a pinion 70 mounted upon the carrier 58, so that if either guard member 66 or 67 is moved inward or outward by the knobs 71, the other guard member will move synchronously therewith. Therefore if one saddle or guard is brought into contact with one side of the foot or last, and the other saddle or guard is against the other side thereof, it insures that the foot or last is centered on the rest 6, and held in the correct position so that other measurements may be taken, or true and accurate data obtained. There is an index scale 72 mounted on one saddle or guard 67 and an index pointer 73 in connection therewith operated by the other saddle or guard member 66, and the scale 72 and index pointer 73 moving in opposite directions the two guard members at their adjacent ends are at an equal distance from the center line of the machine, but the guard member 67 is longer than the guard member 66 so that the length of its scale 72 shall be equal to the collective travels of the guard member 67 and of the index pointer 73. This allows a full sized scale to be used, and the pointer 73 gives a true reading of the width across the foot or last at the ball joint, or widest point.

The heel platform 2 is so mounted by means of a depending leg 78 in a curved guide on the base, that it can be moved up or down in a curve whose radius is struck from a given point on the datum line, so as to remain at a substantially uniform distance from such point in all positions.

74 is an upstanding curved rack bar operated by means of a pinion 75 so that by turning the pinion 75 by means of the milled head 76 the heel platform 2 is raised or lowered to correspond with the height of heel required, and the said heel platform being operated upon a radius, has the effect of preventing the heel becoming farther away from the ball joint tread line as the heel is raised; which would be the effect if the heel were raised in a vertical direction.

77 is a set pin for locking the heel platform at the required height. In connection with this heel platform a scale is provided on the curved guide, and the leg 78 forms an index so as to register the height to which the said platform is moved.

The upright 3 at the back of the heel platform 2 may have an opening in it, closable by a sliding gate 79, on which the index line or mark 44 aforesaid is displayed. By removing this gate 79, an opening is provided to allow clearance for the wood chuck on partly made lasts to project through, in cases where it is desired during the process of making, to test the lasts straight from the lathe with wood chucks still on, in order to ascertain whether such lasts are properly graded in sizes and widths, and correspond with the model or standard from which they are being reproduced, and if not what alterations are required to make them correspond. The lasts when finished proceed to the boot manufacturers, and bear marks to denote size, widths, swing, proportions and so on. The boots when made carry similar markings to the last they have been made upon.

Mounted in a guide 80 on the carriage of the forepart gage at the toe end, is a movable slide 81, an upright 82 on which can be brought by hand against the toe end of the foot or last. This upright 82 has a sliding member or strap 83 on it, which can be moved up and down the upright 82 by the finger piece 84, and has a scale in connection therewith, so that the spring of the foot or last at the toe end can be ascertained, also the distance of the ball joint from the toe end of the foot or last can be ascertained by a scale 85 on the slide 81.

The instep carriage 7 of the apparatus has in connection therewith a vertically sliding thimble 87, and provided with an internal spring 88, the pressing down of this thimble 87 and holding it down by a locking device 89, keeping the spring in compression. By releasing this locking device 89, the top of the thimble 87 springs upward against the base of the foot or last at the arch of the instep, a scale 90 in connection with such thimble denoting at a glance by means of an index on the part 7, the height of the arch, that is the rise or fall of the arch elevation. As in the former patents hereinbefore referred to the turning of a handle 12 moves the ball joint carriage 4 and the instep carriage 7 into such relative positions, that as soon as the ball joint carriage locates the ball joint of the foot or last, the instep will have been carried into the exact position necessary to locate the arch of the instep.

Mounted between the ball joint carriage 4, and the instep carriage 7, so as to move with the former is a second vertically sliding thimble 91 provided with an internal spring, the pressing down of this thimble 91 and holding it down by a locking device 92, keeping the spring in compression. By releasing this locking device 92, the top of this second thimble 91 springs upward against the underneath part of the waist of the foot or last, that is the spring of the arch of the instep at the lower part. A scale in connection with such thimble 91 denotes at a glance the actual elevation. This scale is similar to the scale 90 of the thimble 87.

In connection with the top of the thimble 87 a little bracket or mounting 94 having an eye or slot in it forms a guide for the tape measure 95, and the top of the thimble 91 has a similar bracket or mounting 96 and tape measure 97 for the purpose of measuring the girth of the foot at the metatarsus. The ends of the jaws 66 and 67 have each of them a similar bracket or mounting 98 through which a tape measure 99 is passed. A tape 99 is also passed through a similar bracket or mounting 100 located in a slot in the rest 6. These tapes are for measuring the girths of the foot or last at the instep, at the metatarsus, and at the ball joint. Each bracket or mounting is supported on a center point 101 in such a manner that it will rock thereon in one direction or the other, whereby the tape will adjust itself according to the angle at which it is passed around the foot or last, and thus insure the even passage of the tape without crumpling. An eye or loop 102 is also provided in connection with the heel platform 2, through which another measuring tape 104 is passed.

At one end of the machine beyond the toe gage 82, I provide a surface gage for testing and measuring the upper part of the foot or last, and thereby accurately determining the thickness, position and elevations of the foot or last at various parts. This surface gage consists of a long horizontal bar 106, mounted and adapted to slide in a bracket 107 secured to an upstanding pillar 108 supported on the base 1 so as to occupy the true center line of the machine. This horizontal bar 106 extends longitudinally of the machine and is long enough to extend from the pillar 108 to the upright 3 at the back of the heel, while at the outer end it carries a vertical pointer 109 capable of vertical adjustment, and by means of a slide movable on the cross arm at the end of the horizontal bar 106, is capable of transverse adjustment as well. A scale 110 with index is provided in connection with the vertical adjustment, and a scale 111 and index in connection with transverse displacement. Another scale 113 and index pointer 114 is provided for measuring the distance of any part of the foot or last from the heel. By means of thumbscrews or spring locking catches 115, 116 and 117, the various adjustable parts of this surface gage can be clamped at any positions to which they may have been previously adjusted. It will therefore be seen that the vertical pointer 109 can be adjusted not only perpendicularly, but by means of its slide it can be brought either into the dead vertical center plane of the machine, or to one side or other of the said vertical center plane, while the horizontal bar 106 allows for longitudinal adjustment. Thus I am able to move the pointer 109 longitudinally along the dead center line of the machine, or by transverse adjustment along lines dead parallel with the center line to any position required, after which the pointer by slackening the screw 15, can be moved downward until its point comes against the foot or last to locate the point of measurement required. The adjustment is along lines which are positively rectilinear, and the greatest accuracy of measurement is the result.

To test or measure say the top cone or ridge of a last or some other part of the last or of the foot, as for instance the galosh center point the horizontal bar 106 is drawn out until the vertical pointer 109 rests over the scale 48 which is indicating the side swell at the heel, and then after transverse adjustment of the pointer 109 the horizontal bar 106 is moved back, and the positions of any part of the cone top relative to the side swell and their distance from the imaginary center line, is determined at a glance. The scale on the cross arm 111 would give a scale reading, but as this might involve calculations, the plan of bringing the vertical pointer over the already adjusted heel scale obviates the necessity of this calculation.

To denote the exact position of the galosh point, the pointer 109 is brought into register with the ball joint, and is then moved transversly by means of the cross slide, so that it will mark or define a line across the ball joint. If it is desired to have the galosh point say one eighth of an inch nearer to the toe than the line across the ball joint, and three fourths of an inch to the side of the datum line, then by longitudinal and transverse adjustment of the pointer 109 (by means of the cross slide, and the horizontal arm 106), the exact spot can be located, and by bringing the pointer down perpendicularly, the exact spot is marked or defined on the last. Thus the precise position of the galosh point can be determined, whether such point is to lie centrally of the last or to lie to one side or other thereof, or be forward or rearward of the ball joint, or coincident therewith. Again, should the designer wish to determine the most prominent or highest point of the last at any given distance from either side of said ball joint line and its distance from the datum line, he moves the pointer 109 until the point in question is located, and then reads from the scales 111, 110, and 114 the information desired.

This surface gage is also useful for ascertaining the height of the last above the heel. Then furthermore to denote the distance of the instep from the back of the heel, the pointer 109 is adjusted to bring it over the instep, and then by moving the horizontal bar 106, the distance between the two points can then be read off on the scale 113; or to measure the thickness of the foot or last at the instep, the pointer 109 is adjusted so as to touch the top of foot or last above the instep thimble 87 hereinbefore referred to, and the distance from the tip of the pointer 109 to the top of the thimble 87 is readily ascertained by means of the scales 90 and 110. Again by further adjustment, the pointer 109 can be brought over the lower instep or metatarsal thimble 91, and then by moving the horizontal bar 106 the distance of a given point on the metatarsus from the back of the heel can be read off on the scale 113, also the thickness of the foot or last between the end of the pointer 109 and the metatarsal thimble 91 can be read off by the scale 110 and the scale on the thimble 91.

The surface gage is used again to denote the thickness of the foot or last at the ball joint. The pointer 109 is adjusted to the center of the foot or last by the aid of the scale 111, and the thickness required to be ascertained is ascertainable by two methods, either by moving the pointer 109 until its tip comes against the top of the foot or last at the ball joint, and the thickness of the part to be measured is read off on the scale 110, which is marked upon the vertical pointer 109, or by measuring the distance (when the foot or last has been removed) from the tip of the pointer 109 to the center of the little bracket or mounting 100 that carries the measuring tape 99. The pointer 109 can be used to denote the elevation of any stipulated point on the upper surface of the foot or last across the balljoint, or measure the distance of such point from the sides or from the center line, the scale 72 and index pointer 73 of the ball joint index gage being brought into requisition for this purpose if desired. For instance if the scale 72 of the index gage indicated the width across the balljoint as 3½ inches, then by moving the vertical pointer 109 seven-eighths of an inch from the center of or zero mark on the cross scale 111, to one side or other of the said zero mark, the tip of the pointer will occupy the position of exactly three-fourths of the way across the ball joint, after which the pointer is moved downward until its point comes against the foot or last, and thus denote by means of its scale 109, the elevation of the foot or last at this given point.

The surface gage can be used to denote the position of the toe or front of the last or foot, as well as any other point or position thereon, also to denote straight lines, section lines and angle lines divided in almost any way desired. For instance when a last or foot is set upon the machine, and the ball joint centered by the index gage or locator "58" and the toe locating member 82 engages the toe end, it is not always necessary that the extreme toe end of the foot or last shall be exactly upon the center line. To provide for this, the said toe locator 82 can be marked with lines to denote the exact position of the toe relative to the center line, and the pointer of the surface gage may be used to describe a straight line from a given position across the ball joint, and a longitudinal line from the extreme end of the toe bisecting the said line across the ball joint. In order to more readily effect this, the pillar 108 which carries the horizontal bar 106 can be mounted upon a slide rest 119 so as to be movable crosswise of the machine, on the base 1. The pillar can thus be moved by means of its slide, so that the pointer will describe a straight line across the ball joint, while another line can be drawn between the end of the toe to a point on the line across the ball joint or divisional lines may be described by the pointer by sliding the horizontal bar 106 from any point on the last or foot to any other point desired, either lengthwise or crosswise. 120 is a screw for locking the pillar 108 on the slide. The bracket 107 which carries the horizontal bar 106, has a round pillar 121 which fits into a socket in the pillar 108, so as to allow the bracket 107 with its bar 106 to be turned to any angle and secured in the desired position by the locking screw 122. The bracket 107 is provided with an index 123 which moving over a scale 124, gives a scale reading of the angle to which the bracket 107 is turned. By this means the horizontal bar 106 and the cross arm 111 can be set at any desired angle relative to the dead center line, so that angular lines may be described by the pointer from any point on the last or foot to any other point desired. The horizontal bar 106 can however always be brought back into the longitudinal position, and by means of the scale 124 set into the dead vertical center plane of the machine, in which case the adjustment can be only along lines which are positively rectilinear. The slide rest 119 may have a scale marked on it, to register the position of the pillar.

As in the prior patent referred to shapes or designs of the different bottom shapes of the forepart of the boots or lasts supplied are engraved on the plates 18 of the fore part gage. These different shapes shown in Figs. 9, 10 and 11 may indicate the required changes of angle construction of the forepart of the foot, so as to provide for the different classes of human feet, and each shape may be differentiated by a different color. For instance the bottom shape in which the great toe has a considerable angle twist may be denoted by black lines 126, the bottom shape in which the great toe has a lesser angle twist may be indicated by blue lines 127, and the bottom shape in which the angle twist is reduced to practically zero, may be indicated by red lines 128. The said plates 18 are removable so that they can be turned over and refixed for right and left foot to display the opposite foot designs. The said shapes are also shown in Fig. 2.

In order to allow any of the aforesaid designs on the plates 18 to be brought into register with the bottom of the sole, so that the shape of the sole can be ascertained, a pivoted handle 22 is provided operating a pair of sliding bars 23 joined together by a cross piece 24. Each of these bars carries a stud 25 engaging the slots 19 in the table 20, which slots are set at an angle, and the operation of the handle 22 therefore expands or contracts the pair of tables 20, and simultaneously expands or contracts the plates 18, which are mounted thereon. The extent of contraction of the tables 20 together with the plates 18 mounted thereon, is limited by a pin 27 on each table 14, entering a slot 28 in each table 20, the ends of the slots forming abutments for the pins, while the expansion of the tables 20 together with the plates 18, is limited by the handle 22 coming against a stop 29. A further object of the pins 27 and slots 28 is to hold the tables 20 down on the tables 14. Consequently when a person's foot is placed on the fore part gage, it is easy to see which shape is most suitable for the foot. In order to register the width of the sole, a dial 32 is provided which by means of an index 33 indicates the precise expansion or contraction of the tables 20, and the engraved plates 18 on the top of them, and enables the shape of the sole as well as its width to be ascertained. This dial is arranged by the mechanism now to be described to approach or recede from the longitudinal center or datum line of the machine, at the same time as, and in unison with, the contraction and expansion of the tables 14 of the fore part gage, but to travel longitudinally in unison with the ball joint carriage. In order to effect this, a part 34 on the underside of the dial plate 32 slides in a dovetail groove or track 35 in the ball joint carriage 4, such groove or track 35 being at right angles to the longitudinal center line of the machine. The dial by means of the said part 34, is made to move outward or inward along the track 35 by the expansion and contraction of the flat tables 14 as they travel longitudinally away from, or toward the disk 11. This in and out movement is brought about by coupling the part 34 to one of the tables 14 by means of a stud 36 on the part 34 entering a slot 37 in the said table 14, so that the expanding of the tables 14 will move outward the dial plate 32, and the contraction of the tables will draw in the said dial plate. The slots 37 are made a considerable length because the fore part gage has a greater travel than the ball joint carriage 4. The index 33 is pivoted to the dial plate at 38. The expansion or contraction of the tables 20 by the handle 22 moves this index on the dial, this being brought about by coupling the index to a link 39 sliding in guides in the dial plate 32, one end of which link has a stud 40 engaging a slot 41 in the table 20. The dial and index move in unison when the handle 12 is turned, and it is only when the handle 22 is turned, that the index is moved along the scale thus registering the adjustment of the tables 20 and the engraved plates 18 above them.

Figs. 12, 13 and 14 illustrate diagrammatically three types of feet, Fig. 13 showing a foot with long toes, Fig. 14 is foot with short toes, and Fig. 12 a foot with medium toes. The foot of Fig. 12 has a perfectly fitting boot applied to it, but the feet of Figs. 13 and 14 though of the same length, could not have the same boot applied to them with accuracy or comfort. The present machine enables any of these three feet to be fitted with a boot from stock, with as much accuracy and comfort, as they could be with boots made to measure, by engraving on the plates 18 of the fore part gage, a scale 129 to indicate short toes, medium toes, and long toes. This scale will indicate at a glance the length of a person's toes whether short, long or medium, and enable him to be fitted with boots accordingly.

In connection with the ball joint index gage or locator, members 131 (Fig. 4) may be used which are shaped at end 132 with a long declining curve and a small right angle niche 133 at about the top of the curve. Two of these members are used, one at each side of the last 134, and are adapted to insinuate themselves underneath the last at the sides, until the small right-angled niche 133 engages with the feathers of the last and form stops to prevent these members going any farther. Springs 135 keep the members 131 up to their work. The object of this device is to give the distance from feather to feather and also to denote if the feathers are equal in elevation. Similar devices may be used in connection with the heel supports to engage upon the edges of the heel, and besides giving the distance apart, to denote if one edge is higher than the other.

The method of using the foot and last measuring machine may be summarized as follows:—The various lengths of measuring tapes are spread apart on either side of the machine, ready for the reception of a foot or last. The heel is now placed on the heel rest, so that its backmost point registers with the central index line or mark, and the fore part of the foot or last is placed on the fore part gage. The handle 12 turning the upright shaft is then rotated, and thereby the ball joint carriage is adjusted to locate the ball joint, the instep carriage to locate the instep, and the fore part gage brought into correct position for use. The members of the index gage at the ball joint, are brought into contact with the opposite sides of foot or last, in order to so position or centralize it, that an imaginary datum line is established passing through mid-width of the widest part of the foot to the backmost part of the heel, and the heel is also locked at the central index mark by the sliding jaws of the index gage. The width of the heel and its swell at either side of the datum line (which of course does not necessarily correspond with the dead center line of the machine) are then plainly shown on the index scales 47 and 48, the width of the foot or last is displayed on the scale of the index gage or locator 58, and the size of the foot can be read on the disk 11 giving the size of boot required. The disk 11 is locked by the device 13, and the index gage at the heel is also locked by the lock 55. In the drawing, the disk 11 registers No. 9½ men's size. The shape of the boot at the fore part most suitable for the comfort of the foot being measured, is shown by the fore part gage, which has engraved upon it, the various bottom shapes of boots supplied. The gage which has been automatically moved by the turning of the handle 12, can be further adjusted by the handle 22 to expand or contract the tables 20 and the plates 18 on the top of them, and cause the designs thereon to expand or contract the width to suit the foot or last upon the machine, also indicate at a glance the length of the toes. The index dial 32 shows the width of the sole. The fitting of the foot is next ascertained by measuring the girth of the foot, at various points. The ends of the tape 95 are raised to go around the instep of the foot, and measurement is taken from a marked point at one end, to a marked point at the other end, thus denoting the fitting of the boot at the instep. The ends of the other tapes are also passed around the foot at the ball joint, the heel and the metatarsus, to ascertain the girth and consequently the fitting of the boot at those parts. The surface gage is also brought into use, to test and measure the upper part of the foot or last, and thereby determine the position and elevation of the foot or last or its side swell at various parts, and this surface gage in conjunction with the supports for the heel, the instep, the metatarsus and the ball joint, determines the thickness of the foot or last at various parts. Furthermore, the surface gage may be utilized to determine the angle of the datum line relative to the dead center line of the machine. Finally the insinuating members 131 are used when required to ascertain the distance from feather to feather at the ball joint and heel, and denote if the feathers are equal in elevation, also the spring of the foot or last at the toe end, and the distance of ball joint from the toe, can be ascertained by the movable slide 81.

It will be seen that the disk 11 carries an outer circle of figures and an inner circle of figures. The outer circle of figures represents the English grade of sizes and half sizes that have been in common use in the trade for many years, while the inside circle of figures represents a new grade of sizes that I suggest that boot manufacturers using my machine should adopt in preference to the other. The outer circle embraces the extremes of 5 men's size to 11 men's size, which including half sizes provides thirteen different sizes, but the new grade of sizes while covering the same extremes only requires nine sizes, and yet my machine secures better results with a range of nine sizes than has hitherto been obtained with a range of thirteen sizes.

It will be seen that by my present invention all the different parts of a last can be measured and tested, also the elevations, contours, angle lines etcetera can be denoted, so that pattern cutting for the component parts of a boot can be outlined in a very accurate way and facilitate much better results. The accurate designing of the patterns for the uppers which is possible by this invention, insures that the component parts cut from these patterns, will conform to the last without any strain, thus totally avoiding that depreciation in the leather which occurs when the leather has been unduly strained.

It will be understood that I do not consider myself limited to specific details of construction or the exact mode of operation herein described, as various changes would be readily suggested, which while they might change the appearance of the machine, would not involve a departure from the scope of the invention herein set forth. Accordingly the mounting of the various parts, the means by which the various parts are made adjustable, and the relative position of the various parts, may be varied under this invention. It is also understood that the terminology used, is descriptive and not limiting, being chosen merely as a convenient form of describing the things which constitute the invention herein disclosed.

I declare that what I claim is:—

1. A foot or last measuring machine, comprising in combination a base, a support for the heel carried on the base, and having a central index line or mark against which the backmost point of the heel may be placed, a ball joint support slidably mounted on the base, an index gage in connection with the ball joint support whose members are adapted to engage opposite sides of the foot or last at the ball joint, operative connections between said gage members for causing them to move on said ball joint support equally and in opposite directions, and an index gage in connection with the heel support for locking the heel at the central index mark, and determining the width of the heel, and its swell at either side of the datum line determined by the action of said index gages.

2. A foot or last measuring apparatus, comprising in combination, a base, and a surface gage carried by the base for testing and measuring the upper part of the foot or last, said surface gage comprising an upstanding pillar on the base, a horizontal bar mounted and adapted to slide longitudinally in a guide at the top of the upstanding pillar, a horizontal cross arm on the end of said horizontal bar and a vertical pointer slidably mounted on said cross arm and vertically adjustable thereon, whereby said pointer is capable of being adjusted not only vertically, but also of being set into the dead center line of the horizontal bar, or to one side or the other thereof.

3. A foot or last measuring apparatus comprising in combination a base, an upstanding pillar on the base, a horizontal bar mounted and adapted to slide in a guide at the top of the upstanding pillar, a scale and index in connection with this horizontal bar, a slide carried by the end of the said horizontal bar so as to have transverse adjustment, a pointer vertically guided in the said slide, a scale and index in connection with the slide and a scale and index in connection with the pointer.

4. A foot or last measuring apparatus, comprising in combination a base, an upstanding pillar on the base, a guide mounted on the pillar, so as to be adjustable on a vertical axis, a horizontal bar having a scale mounted in the said guide so as to slide horizontally therein, a pointer vertically guided at one end of the horizontal arm and provided with a vertical scale, and a scale and index in connection with the pillar and guide whereby the horizontal arm may be set so as to occupy the true center line of the machine, or be adjusted to any desired angle relative thereto.

5. A foot or last measuring apparatus, comprising in combination a base, an upstanding pillar mounted upon a slide rest upon the base so as to have a transverse adjustment, a longitudinal bar mounted horizonally and adapted to slide in a guide at the top of the pillar, a horizontal cross arm at the end of the longitudinal bar, a slide mounted on the said cross arm so that it can be set into the dead center line of the longitudinal bar or to one side or the other thereof, and a pointer mounted vertically in the said slide and adjustable therein in a perpendicular direction.

6. A foot or last measuring apparatus, comprising in combination a base, a support for the heel carried by the base having in connection therewith a central index line or mark, against which the backmost point of the heel is placed, a ball joint support slidably mounted on the base, an index gage in connection with the ball joint support whose members are brought into contact with the opposite sides of the ball joint in order to so position the same that a datum line is established passing through mid width of the widest part of the foot from the backmost part of the heel, an index gage in connection with the heel support formed of two spring operated jaws slidable in suitable bearings at right angles to the datum line, projections on the jaws by compressing which toward one another, the jaws are spaced apart and the springs compressed, a locking device for holding the jaws in the spread apart position, or for releasing the same to enable the jaws to spring inward against the respective sides of the heel, and index scales for registering the width of the heel, and its swell at either side of the datum line.

7. A foot or last measuring apparatus, comprising in combination a base, a support for the heel carried by the base having in connection therewith a central index mark or line against which the backmost part of the heel is placed, a ball joint support slidably mounted on the base, an index gage or locator in connection with the ball joint support adapted to be turned through an angle for right and left feet, two saddle or guard pieces mounted thereon one at each side of a datum line passing through mid-width of the widest part of the foot to the backmost part of the heel, a rack bar in connection with each saddle or guard piece meshing with opposite sides of a pinion wheel in such manner as to cause the guard members to move synchronously with each other in opposite directions, and an index scale to give a true reading of the width across the foot or last at its widest point.

8. In a foot or last measuring apparatus having a base, a ball joint support slidably mounted on the base, supports for the ball joint and fore part of the foot slidably mounted on the base, an index gage or locator having two guard members in connection therewith, an index scale on one of these guards and an index pointer in connection therewith operated by the other guard member, one of the said guard members which at their adjacent ends are at an equal distance from the center line of the machine being longer than the other, so that the length of its scale shall be equal to the collective travels of the guard member to which the scale is attached, and of the index pointer operated by the other guard member.

9. A foot or last measuring apparatus comprising a base, a support for the heel carried by the base, a ball joint support and a fore part gage differentially slidable on the base, plates on the fore part gage carrying diagrams of shoe contours, a central longitudinal slide having a cross head at its forward end projecting forwardly from the fore part gage, but capable of independent longitudinal movement by means of a handle, links having a pivotal connection at one end with the opposite ends of the cross head, studs at the other end, and angular slots in the contour plates in which the said studs engage, whereby such plates can be expanded or contracted by hand for the purpose of bringing any of the shoe contours into register with the bottom of the sole without interfering with their automatic expansion and contraction taking place, as the carriage of the ball joint and fore part gage are moved differentially in a longitudinal direction.

10. In a foot or last measuring apparatus, having a base, a ball joint support and fore part gage differentially slidable on the base, plates carrying diagrams of shoe contours in connection with the fore part gage, which has an automatic expansion or contraction with the longitudinal motion of the fore part gage, a dial plate mounted on the ball joint carriage so as to travel longitudinally in connection therewith, but capable of a transverse adjustment independently thereof, means whereby the said dial plate is moved transversely in unison with the automatic expansion and contraction of the contour plates of the fore part gage, an index pointer pivoted to the dial plate, a link having a pivotal connection with the index pointer and provided with a stud at one end, and a slot extending longitudinally of one of the said contour plates, whereby whenever the shoe contour plates are adjusted by hand for the purpose of bringing any of the shoe contours into register with the bottom of the sole, the index will indicate on the dial the precise expansion of the said contour plates.

11. A foot or last measuring apparatus, comprising in combination a base, a curved guide carried by the base, a support for the heel mounted in the curved guide so that it can be moved up or down, the curve of the guide being struck from a given point on the longitudinal center line of the machine so as to cause the heel support to remain in all positions at a substantially uniform distance from such point, and a pinion driven rack bar for slidably positioning the heel rest as to height.

12. A foot or last measuring apparatus, comprising in combination a base, a support for the heel carried by the base, an upright at the back of the rest for the heel to rest against, the said upright having an opening, and a sliding gate for closing the said opening when the foot or last is to be measured or remaining open to allow clearance for the wood chuck on partly made lasts, in cases where it is desired to test such lasts during the process of making.

13. A foot or last measuring apparatus, comprising in combination a base, a support for the heel carried by the base, a support for the ball joint slidably mounted on the base, a support for the fore part of the foot slidably mounted on the base, a guide piece on the fore part support, and a movable slide, slidably mounted in said guide piece, and having a scale and an upright at its outer end, for the purpose of indicating the distance of the toe end from the ball joint.

14. In a foot or last measuring apparatus, the combination with a base provided with a support for the heel, a support for the ball joint and a support for the fore part of the foot, of a guide piece on the said fore part support, a horizontal slide slidably mounted in the said guide piece and provided with a scale, an upright on the horizontal slide so that the said upright can be brought by hand against the toe end of the foot or last, a vertically adjustable member or strap on the upright and a scale in connection with the strap to indicate the spring of the foot or last at the toe.

15. A foot or last measuring apparatus, comprising a base, an instep support slidably mounted on the base, a sliding member on the instep support, an internal spring therein for forcing said member upward against the base of the foot or last at the arch of the instep, a scale in connection with the sliding member for denoting the height of the arch, and a locking device for holding the spring pressed member down when not in use.

16. In a foot or last measuring apparatus, the combination with a base provided with a support for the heel, and slidable instep, ball joint and fore part gage supports, of a supplementary support located between the said ball joint and instep supports, and connected with the former, a sliding member on the said supplementary support and an internal spring therein for forcing the said member upward against the spring of the instep arch of the foot or last and determining the girth of the foot at the metatarsus.

17. In a foot or last measuring machine, having a base, a ball joint support slidably mounted on the base, a heel support carried by the base, and a pair of members in connection with the ball joint support and the heel support having a declining curve and a niche at the top thereof, adapted to insinuate themselves underneath the last at the sides, for the purpose of denoting the distance from feather to feather, and the feathers' elevation.

In witness whereof, I have hereunto signed my name this 25th day of July, 1914, in the presence of two subscribing witnesses.

ALFRED HARRY CHURCH.

Witnesses:
C. DASHWOOD FROST,
WALTER W. BALL.